United States Patent [19]
Gilbert et al.

[11] Patent Number: 5,419,235
[45] Date of Patent: May 30, 1995

[54] POWER STEERING GEAR ASSEMBLY

[75] Inventors: Wendell L. Gilbert, Pleasant Shade; Nathan E. Kolbe, Lebanon, both of Tenn.

[73] Assignee: TRW Inc., Lyndhurst, Ohio

[21] Appl. No.: 203,276

[22] Filed: Feb. 28, 1994

[51] Int. Cl.[6] .......................... F15B 9/10; B62D 5/06
[52] U.S. Cl. ................... 91/375 R; 91/375 A; 92/13; 180/132
[58] Field of Search ............... 91/434, 374, 375 R, 91/375 A; 92/13, 13.6, 13.8; 60/384; 180/132, 146, 147, 148

[56] References Cited

U.S. PATENT DOCUMENTS

| | | | |
|---|---|---|---|
| 2,912,935 | 11/1959 | Wick et al. | 92/13.8 |
| 3,286,637 | 11/1966 | Malec | 92/13.8 |
| 3,315,570 | 4/1967 | Brewer et al. | |
| 3,916,730 | 11/1975 | Sheppard | 180/147 X |
| 3,935,672 | 2/1976 | Goff | |
| 4,367,672 | 1/1983 | Elser | |
| 4,625,624 | 12/1986 | Adams | 91/375 A |
| 4,648,307 | 3/1987 | Rabe | |
| 4,773,303 | 9/1988 | Stroud | |
| 5,139,106 | 8/1992 | Elser et al. | 180/148 |

Primary Examiner—Edward K. Look
Assistant Examiner—Hoang Nguyen
Attorney, Agent, or Firm—Tarolli, Sundheim & Covell

[57] ABSTRACT

A steering gear assembly (12) for a vehicle having steerable wheels includes a housing (14) defining a chamber (16) and a piston (18) movable through a work stroke in the chamber. The piston (18) is connected for movement with the steerable wheels of the vehicle. An actuator assembly (10) for adjusting the end-of-stroke position of the piston (18) is mounted in the housing (14) in a first orientation. The adjusting assembly (10) is removable from the housing (14), and is mountable in the housing in a second orientation opposite to the first orientation to reset the end-of-stroke position of the piston. The adjusting assembly (10) includes a pin (130) press fit in a sleeve (110) and movable in the sleeve to set the end-of-stroke position of the piston (18). The pin (130) and sleeve (110) are movable from a first position mounted in the housing (14) in a first orientation to a second position in which the pin and sleeve are mounted in the housing in a second orientation opposite to the first orientation.

18 Claims, 4 Drawing Sheets

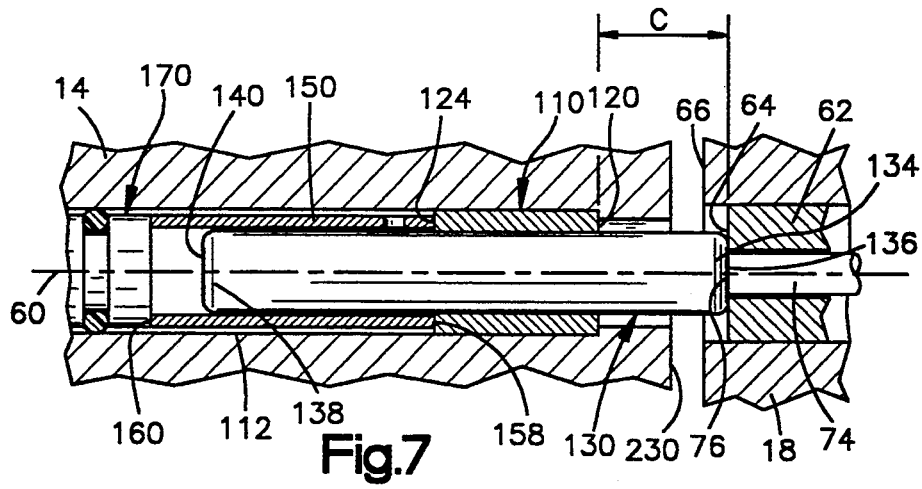
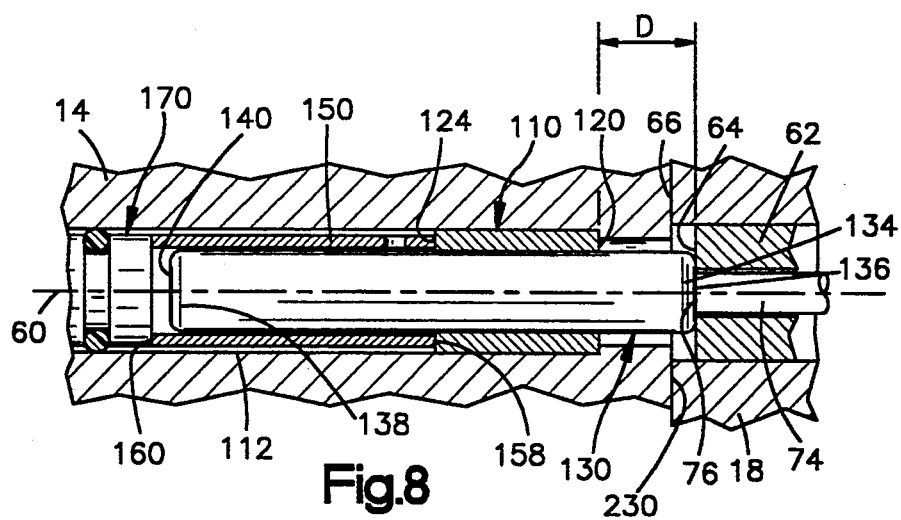
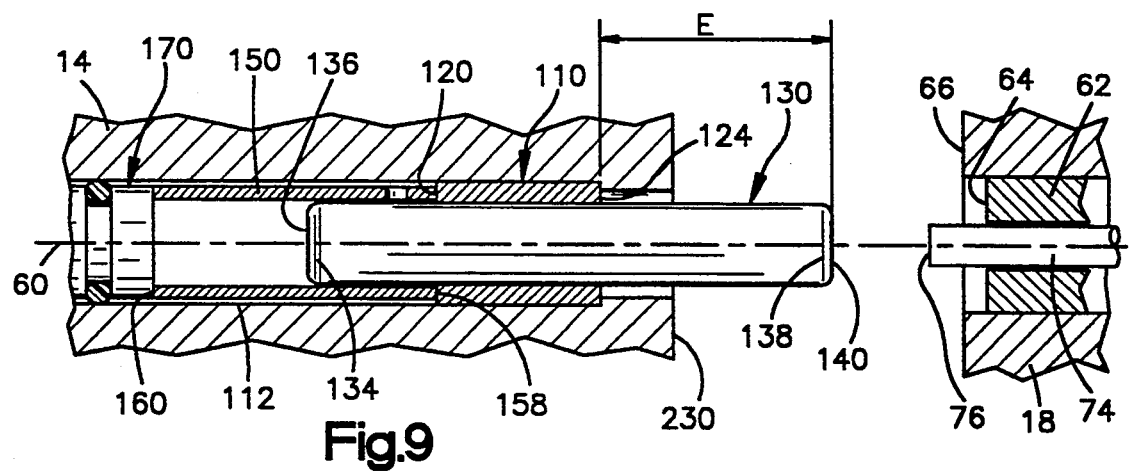

POWER STEERING GEAR ASSEMBLY

BACKGROUND OF THE INVENTION

1. Technical Field

The present invention relates to a power steering gear assembly. In particular, the present invention relates to an actuator assembly for a pressure relief valve in a fluid power assisted steering gear assembly.

2. Description of the Prior Art

Fluid power assisted steering gear assemblies for vehicles are known. One such steering gear assembly is disclosed in U.S. Pat. No. 4,773,303 and includes a piston which moves through a work stroke in a fluid chamber. The piston is connected through a pitman arm with the steerable wheels of the vehicle. The steerable wheels, at the end of their range of movement, engage steering stops on the vehicle.

The steering gear assembly disclosed in U.S. Pat. No. 4,773,303 includes a valve assembly movable with the piston in the fluid chamber. When the piston reaches a predetermined end-of-stroke position in the chamber, the valve assembly is actuated and relieves fluid pressure in the chamber. The end-of-stroke position of the piston is set so that pressure in the fluid chamber is relieved just prior to the steerable wheels engaging the steering stops on the vehicle. Relieving the pressure protects the power steering pump and other parts of the steering gear and steering linkage from damage.

The steering stops on a vehicle may sometimes be moved to provide a smaller range of movement of the steerable wheels of the vehicle. When this is done, it becomes necessary to adjust the steering gear assembly to provide for a shorter work stroke of the piston. The steering gear assembly of U.S. Pat. No. 4,773,303 must be removed from the vehicle and disassembled in order to accomplish this. It would be desirable to be able to reset the end-of-stroke position of the piston to provide for a shorter work stroke without disassembling the steering gear.

SUMMARY OF THE INVENTION

The present invention is a steering gear assembly for a vehicle having steerable wheels. The steering gear assembly includes a housing defining a chamber. A piston is movable through a work stroke in the chamber and has an end-of-stroke position. The piston is connected for movement with the steerable wheels of the vehicle. The steering gear assembly includes means for adjusting the end-of-stroke position of the piston. The adjusting means is mounted in the housing in a first orientation, and is removable from the housing and mountable in the housing in a second orientation opposite to the first orientation to reset the end-of-stroke position of the piston. The adjusting means includes a pin press fit in a sleeve and movable in the sleeve to set the end-of-stroke position of the piston. The pin and sleeve have a first position mounted in the housing in a first orientation. The pin and sleeve are movable from the first position to a second position in which the pin and sleeve are mounted in the housing in a second orientation opposite to the first orientation. The pin and sleeve when reoriented can provide for a shorter work stroke of the piston. The pin and sleeve can be removed and reoriented without disassembling the steering gear assembly or removing it from the vehicle.

The present invention is also a method comprising the steps of press fitting a pin in a sleeve; mounting the interfitted pin and sleeve in a first orientation in a steering gear assembly housing; moving the pin relative to the sleeve to set the end-of-stroke position of a piston movable through a work stroke in the housing; removing the interfitted pin and sleeve from the housing; mounting the interfitted pin and sleeve in the housing in a second orientation opposite to the first orientation; and moving the pin relative to the sleeve to reset the end-of-stroke position of the piston.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 7 is a view similar to FIG. 4 showing the parts of the actuator assembly set to an operating position which provides for a longer piston stroke;

FIG. 8 is a view similar to FIG. 4 showing the parts of the actuator assembly in a reset position; and FIG. 9 is a view similar to FIG. 4 showing parts of the actuator assembly reoriented to provide for a shorter piston stroke.

DESCRIPTION OF A PREFERRED EMBODIMENT OF THE INVENTION

Figure 1:
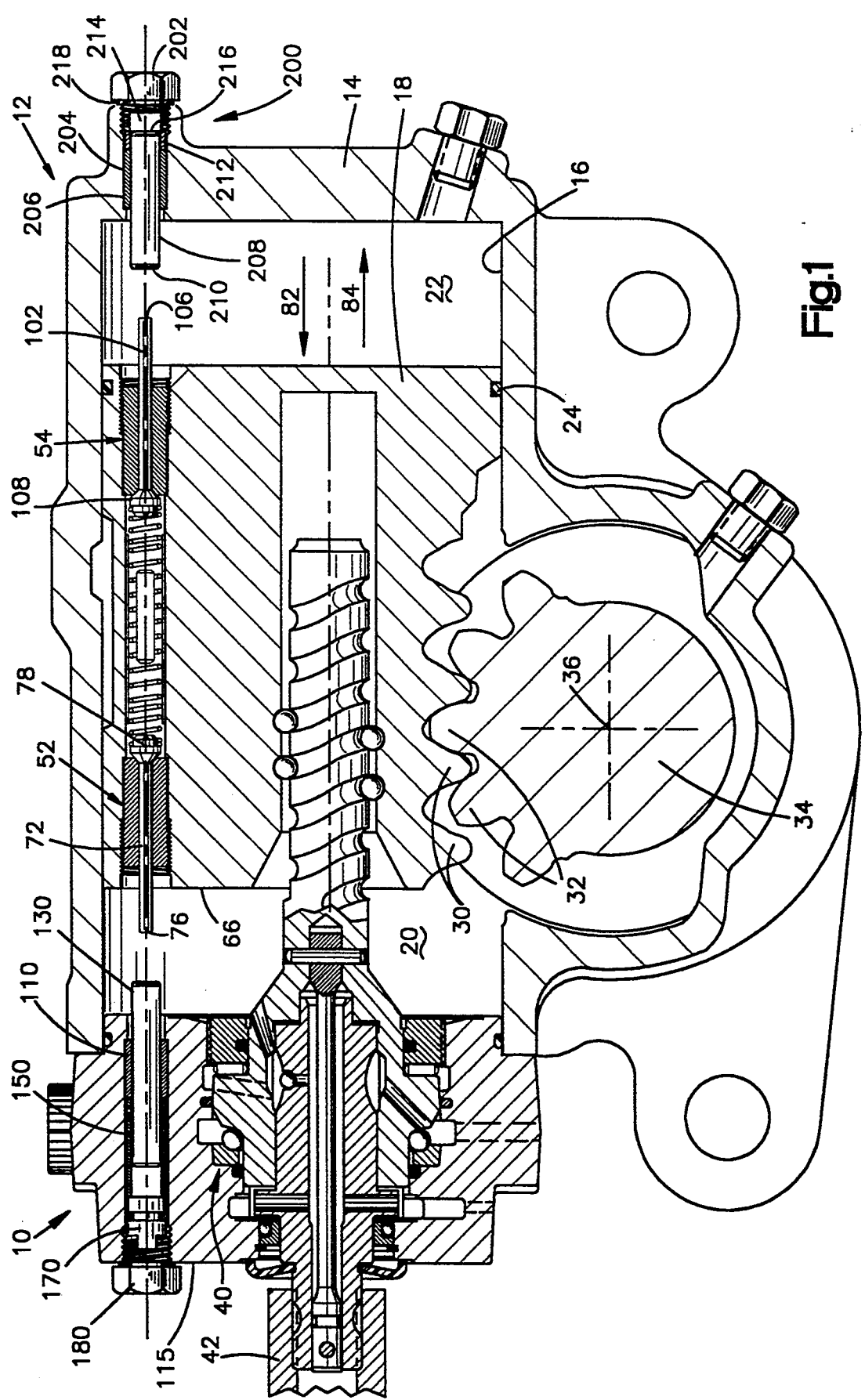
FIG. 1 is a cross-sectional view of a steering gear assembly having an actuator assembly in accordance with the present invention for actuating a pressure relief valve assembly.

The present invention relates to a pressure relief valve actuator assembly for use in a fluid power assist steering gear assembly. The present invention is applicable to various actuator assembly constructions. As representative of the present invention, FIG. 1 illustrates an actuator assembly 10. The actuator assembly 10 is part of a fluid power assist steering gear assembly 12 for use in a vehicle. The steering gear assembly 12 is of the type described in U.S. Pat. No. 4,773,303.

The steering gear assembly 12 includes a housing 14. The housing 14 defines a fluid chamber 16. A piston 18 is located in the fluid chamber 16. The piston 18 divides the fluid chamber 16 into a pair of chamber portions 20 and 22. A seal 24 on the piston 18 prevents fluid leakage between the chamber portions 20 and 22.

A plurality of gear teeth 30 on the piston 18 mesh with gear teeth 32 on a sector gear 34. The sector gear 34 is supported on the housing 14 for pivotal movement about an axis 36. The sector gear 34 is connected with a part of a steering linkage mechanism (not shown), typically a pitman arm, to turn the steerable wheels of the vehicle upon pivoting of the sector gear about the axis 36. The steerable wheels have a range of movement as set by steering stops (not shown) fixed to the vehicle.

A fluid flow control valve 40 of a known construction controls the pressurization and venting of the chamber portions 20 and 22. The valve 40 is connected to a steering input shaft 42 of the vehicle. The steering input shaft 42 is connected to the steering wheel of the vehicle to actuate the valve 40 in response to rotation of the steering wheel. Upon rotation of the steering input shaft 42, pressurized fluid at up to 5,000 psi is directed into one chamber portion 20 or 22 while the other chamber portion 22 or 20 is vented. This selective pressurization and venting of the chamber portions 20 and 22 moves the piston 18 in a work stroke within the fluid chamber 16 in a direction parallel to the axis 60. Movement of the piston 22 pivots the sector gear 34 to turn the steerable wheels of the vehicle.

A pressure relief valve assembly 50 is actuatable to stop movement of the piston 18 at the opposite ends of its work stroke, prior to engagement of the steerable wheels with the steering stops. The valve assembly 50 (FIG. 1) includes a pair of poppet valves 52 and 54 disposed at opposite ends of the piston 18. Each poppet valve 52 and 54 vents fluid pressure in its associated chamber portion 20 or 22 just prior to the piston 18 reaching a respective end of the work stroke. As a result, the power steering pump (not shown), the teeth 30 on the piston 18 and the teeth 32 on the sector gear 34 are protected from excessive hydraulic and mechanical loads which may be transmitted through the steering gear assembly 12.

Figures 2, 3:
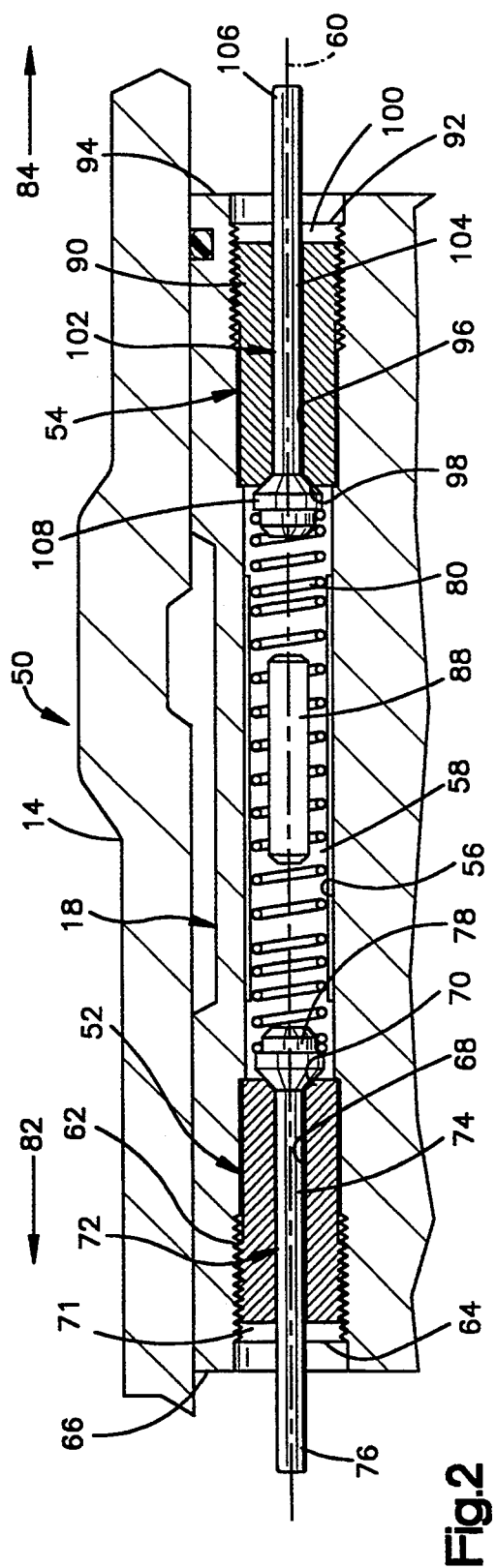
FIG. 2 is an enlarged view of the pressure relief valve assembly of FIG. 1.
FIG. 3 is an enlarged view of the actuator assembly of FIG. 1.

The pressure relief valve assembly 50 is illustrated in more detail in FIG. 2. The poppet valves 52 and 54 are disposed in a valve passage 58 defined by a surface 56 extending through the piston 18 along the axis 60. The poppet valve 52 includes an axially-located valve seat 62 threaded into the piston 18. The valve seat 62 has an outer end face 64 recessed from the left end face 66 (as viewed in FIG. 2) of the piston 18. A fluid passage 68 extends axially through the valve seat 62. The valve seat 62 has at its inner end a valve seat surface 70. A screwdriver slot 71 in the end face 64 provides for assembly of the valve seat 62 into the piston 18.

The poppet valve 52 also includes an axially-located valve member 72. The valve member 72 has a stem 74 extending through the passage 68 in the valve seat 62. The valve stem 74 has an end portion 76 projecting beyond the end face 66 of the piston 18. The valve member 72 has a head portion 78 connected for movement with the stem portion 74.

The valve member head portion 78 normally seals against the valve seat surface 70 under the influence of a compression spring 80 disposed in the passage 58. This sealing engagement between the valve member 72 and the valve seat 62 blocks fluid flow through the passage 58 in a direction 82 (to the left as viewed in FIGS. 1 and 2). Upon the application of sufficient force to the projecting end portion 76 of the valve stem 74, the biasing effect of the spring 80 is overcome and the valve member 72 moves in a direction 84 (to the right as viewed in FIGS. 1 and 2). The valve member head portion 78 moves away from the valve seat surface 70 enabling fluid flow through the passage 58. A spacer rod 88 limits movement of the valve member 72 in the direction 84 to prevent it from coming out of the valve seat 62.

The poppet valve 54 is a mirror image of the poppet valve 52. The poppet valve 54 includes a valve seat 90 threaded into the piston 18. The valve seat 90 has an outer end face 92 recessed from the right end face 94 (as seen in FIGS. 1 and 2) of the piston 18. A fluid passage 96 extends through the valve seat 90. The valve seat 90 has at its inner end a valve seat surface 98. At its outer axial end, the valve seat 90 has a diametrically extending screwdriver slot 100 for assembly of the valve 54.

The poppet valve 54 includes an axially located valve member 102 with a stem portion 104 extending through the fluid passage 96. An end portion 106 of the valve member 102 projects beyond the end face 94 of the piston 18. The valve member 102 has a head portion 108 connected for movement with the stem portion 104.

The valve member head portion 108 normally seals against the valve seat surface 98 under the influence of the spring 80. This sealing engagement blocks fluid flow through the passage 58 in the piston 18 in the direction 84 (to the right as viewed in FIGS. 1 and 2). Upon the application of sufficient force to the projecting end portion 106 of the valve member 102, the valve member head portion 108 moves away from the valve seat surface 98 in the direction 82 (to the left as viewed in FIGS. 1 and 2) to enable fluid flow through the valve 54 in the direction 84. The spacer rod 88 limits inward movement of the valve member 102 to prevent it from coming out of its valve seat 90.

The actuator assembly 10 (FIG. 1) effects opening of the poppet valve 52 to set the end-of-stroke position of the piston 18 when the piston moves in the direction 82. The actuator assembly 10 (FIG. 3) is disposed in an actuator passage 112 defined by a generally cylindrical surface 114 of the housing 14. The actuator passage 112 and the surface 114 are concentric with the axis 60. The actuator passage 112 extends between the chamber 16 and an exterior surface 115 of the housing 14.

The actuator assembly 10 includes a sleeve 110 disposed in the passage 112. The sleeve 110 is a hollow tubular member with an axially extending cylindrical outer surface 116 and a cylindrical inner surface 118 which extends parallel to the outer surface 116. The sleeve 110 is slip fit in the passage 112.

The sleeve 110 has an annular radially extending first end face 120 disposed in abutting engagement with a shoulder 122 on the housing 14. This abutting engagement limits axial inward movement of the sleeve 110 in the passage 112, that is, in the direction 84 or to the right as viewed in FIGS. 1 and 3. The sleeve 110 has at its opposite end an annular radially extending second end face 124.

The actuator assembly 10 includes a pin 130 which is press fit in the sleeve 110 in a coaxial relationship with the sleeve. The pin 130 has a cylindrical outer surface 132 in a tight press fit engagement with the cylindrical inner surface 118 of the sleeve 110. A first end portion 134 of the pin 130 extends axially inward, that is, in the direction 84 or to the right as viewed in FIG. 3, from the first end 120 of the sleeve 110. The pin first end portion 134 includes a circular radially extending first end face 136 of the pin 130. A second end portion 138 of the pin 130 extends axially outward, that is, in the direction 82 or to the left as viewed in FIG. 3, from the second end 124 of the sleeve 110. The pin second end portion 138 includes a circular radially extending second end face 140 of the pin 130.

The actuator assembly 10 also includes a support tube 150 slip fit in the actuator passage 112 in a coaxial relationship with the pin 130 and the sleeve 110. The support tube 130 is disposed axially outward, that is, to the left as viewed in FIG. 2, of the sleeve 110. The support tube 150 is a hollow tubular member having an axially extending cylindrical outer surface 152 in a slip fit relationship with the surface 114 of the housing 14. The surfaces 152 and 114 define between them an annular axially extending clearance channel 154.

The support tube 150 has an axially extending cylindrical inner surface 156 disposed in a slip fit relationship with the cylindrical outer surface 132 of the pin 130. The support tube 150 has an annular radially extending first end face 158 disposed in abutting engagement with the second end 124 of the sleeve 110. The support tube 150 has at its opposite end an annular radially extending second end face 160.

The actuator assembly 110 includes a seal plug 170 disposed in the actuator passage 112 at a location axially outward of the pin 130 and the support tube 150. The seal plug 170 is disposed in a coaxial relationship with the pin 130, the sleeve 110, and the support tube 150. The seal plug 170 includes a cylindrical metal body 172 in abutting engagement with the second end face 160 of the support tube 150. An O-ring 174 in the metal body 172 seals against the surface 114 defining the actuator passage 112. The O-ring 174 blocks fluid flow past the O-ring in the direction 82, that is, to the left as viewed in FIG. 2.

The actuator assembly 110 also includes a plug cap 180 at a location axially outward of the seal plug 170. The plug cap 180 is disposed in a coaxial relationship with the pin 130, the sleeve 110, the support tube 150, and the seal plug 170. The plug cap 180 has an externally threaded portion 182 screwed into the housing 14 and disposed in the actuator passage 112. The threaded portion 182 has a central cavity 184 which receives an axially outwardly projecting nose portion 186 of the seal plug 170. The plug cap 180 has a hex-head driver portion 188. A washer 190 is disposed between the driver portion 188 and an external surface 192 of the housing 14. The plug cap 180 is disposed at a location on the steering gear assembly 12 so as to be accessible in the vehicle.

The steering gear assembly 12 (FIG. 1) also includes a second actuator assembly 200 for opening the poppet valve 54 to set the end-of-stroke position of the piston 18 when the piston moves in the direction 84 (to the right as viewed in FIG. 1). The actuator assembly 200 is similar in construction to the actuator assembly 10. However, the wall of the housing 14 as illustrated is thinner at the location of the second actuator assembly 200. Accordingly, the second actuator assembly 200 is different from the actuator assembly 10 in that an O-ring plug 202 is used instead of the combined plug cap 180 and seal plug 170.

Thus, the second actuator assembly 200 includes a sleeve 204 slip fit in a passage 206 in the housing 14. The sleeve 204 and passage 206 are concentric with the axis 60. A pin 208 is press fit in the sleeve 206 in a coaxial relationship with the sleeve. A first end portion 210 of the pin 208 extends axially inward from the sleeve 204. A support tube 212 is slip fit in the passage 206 in a coaxial relationship with the pin 208 and sleeve 204. The support tube 212 is disposed axially outward, that is, to the right as viewed in FIG. 1, of the sleeve 204.

The O-ring plug 202 (FIG. 1) is screwed into the housing 14 to close the passage 206. The O-ring plug 202 has a central cavity 214 for receiving a second end portion 216 of the pin 208. The O-ring plug 202 includes an O-ring 218 which seals between a hex-head driver portion 220 of the O-ring plug and the housing 14. The O-ring plug 202 is disposed at a location on the steering gear assembly 12 so as to be accessible when the steering gear assembly is mounted in a vehicle.

Figure 4:
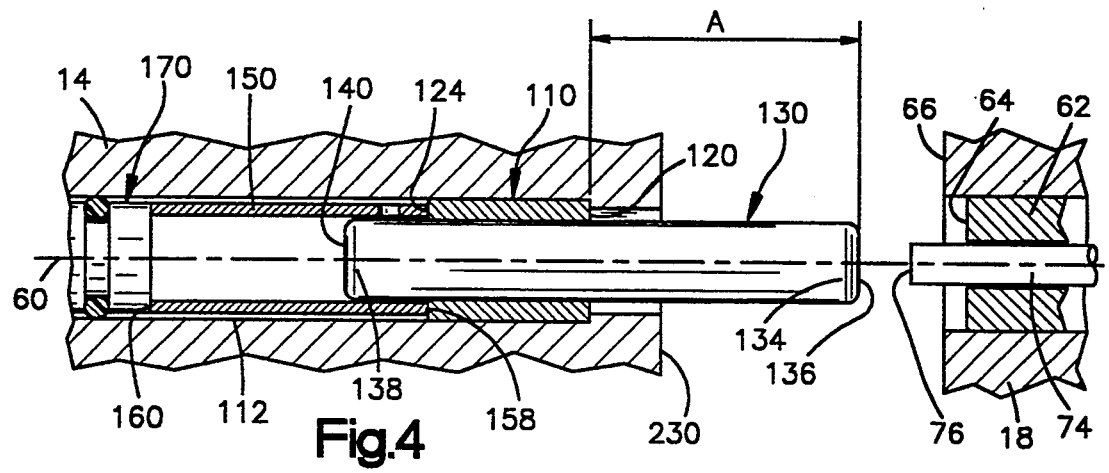
FIG. 4 is an enlarged schematic view showing parts of the actuator assembly in a position after initial assembly of the steering gear assembly.

During initial assembly of the steering gear assembly 12, including the actuator assembly 10, the pin 130 (FIG. 4) is press fit into the sleeve 110. This is done by inserting the pin 130 axially into the sleeve 110 until the first end portion 134 of the pin projects from the first end 120 of the sleeve 110. The first end face 136 of the pin 130 is spaced from the first end 120 of the sleeve 110 by a distance marked A in FIG. 4. The distance A is a predetermined distance selected to be large enough so that the valve seat end face 64 will engage the pin end surface 136 when the piston 18 is moved toward the sleeve 110 as far as it may go no matter where the vehicle steering stop is set. In a preferred embodiment, the pin 130 is press fit in the sleeve 110 tightly enough so that a force of between 500 pounds and 2,000 pounds is needed to overcome the press fit engagement and move the pin relative to the sleeve.

The interfitted pin 130 and sleeve 110 are then inserted in the direction 84 into the actuator passage 112 in the housing 14. The first end 120 of the sleeve 110 engages the shoulder 122 on the housing 14, blocking further inward movement of the interfitted pin and sleeve. The first end portion 134 of the pin 130 projects past the housing inner surface 230 and into the chamber 16.

The support tube 150 (FIG. 4) is then inserted in the direction 84 into the actuator passage 112. The first end 158 of the support tube 150 engages the second end 124 of the sleeve 110, blocking further inward movement of the support tube 150. The seal plug 170 is then inserted in the direction 84 into the actuator passage 112. The plug cap 180 is then screwed into the housing 14. The plug cap 180 blocks movement of the seal plug 170, the support tube 150, and the interfitted sleeve and pin 110 and 130 within the actuator passage 112. The parts of the actuator 10 are in the initial assembly position illustrated in FIG. 4.

Figure 5:
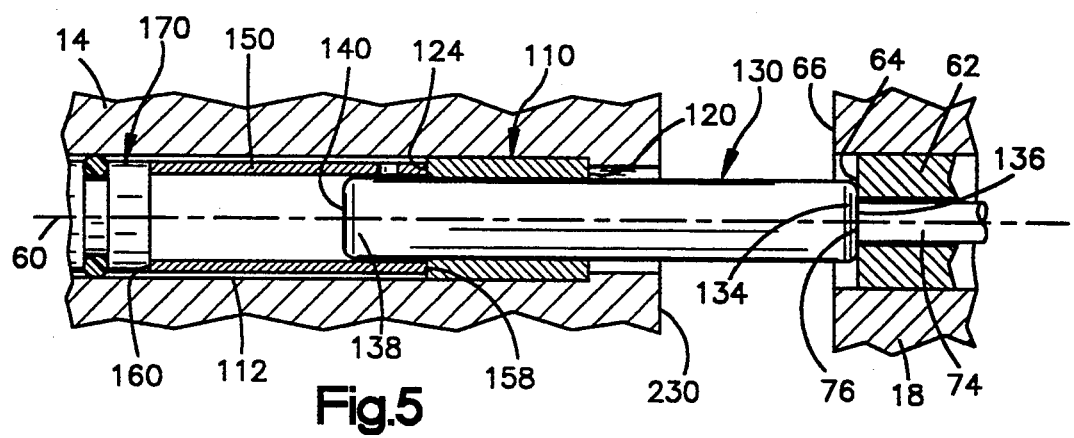
FIG. 5 is a view similar to FIG. 4 showing an intermediate position of the parts during setting of the actuator assembly to an initial operating position.

The initial end-of-stroke position of the piston 18 when the piston moves in the direction 82 is set by operating the steering gear assembly 12 so as to move the piston 18 to the left as viewed in FIG. 1 until the vehicle steering stop is engaged. During this movement of the piston 18 in the direction 82, the end portion 76 of the valve member 72 engages the end face 136 of the projecting end portion 134 of the pin 130. Shortly thereafter, as the piston 18 continues to move in the direction 82, the end face 64 of the valve seat 62 engages the end face 136 of the pin 130. The parts are then in the position shown in FIG. 5.

The engagement of the valve member 72 with the pin 130 causes the valve member 72 to move in the direction 82 relative to the piston 18. The valve member head portion 78 moves off the valve seat surface 70, opening the fluid passage 68 in the valve seat 62. Fluid under pressure can thus flow in a known manner from the pressurized chamber portion 22 through the valve passage 58 into the chamber portion 20 which is being vented as the piston moves in the direction 82. This flow of fluid through the valve passage 58 lowers the pressure in the chamber portion 22 from about 2,175 psi to about 500 to 900 psi. However, there is still sufficient pressure to continue movement of the piston 18 in the direction 82.

As the piston 18 continues to move in the direction 82, the force of the moving piston and valve seat 62 overcomes the press fit engagement between the pin 130 and the sleeve 110. The pin 130 moves axially in the sleeve 110. The support tube 150, which is captured between the seal plug 170 and the sleeve 110, blocks leftward or outward axial movement of the sleeve 110.

Figure 6:
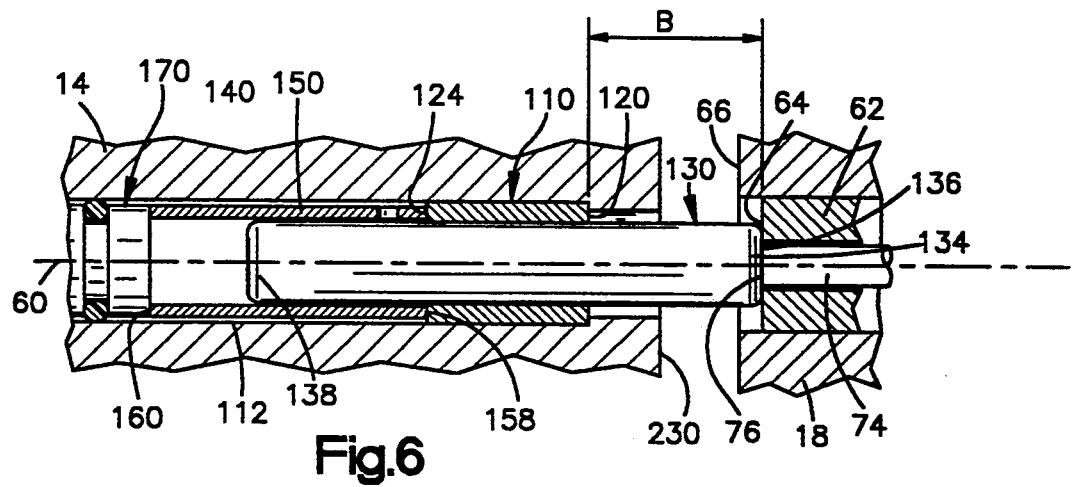
FIG. 6 is a view similar to FIG. 4 showing the parts in the initial operating position.

The pin 130 moves axially in the sleeve 110 until the piston 18 stops moving. The piston 18 stops moving when the vehicle steerable wheels engage the steering stops. The parts of the actuator assembly 10 are then in the position shown in FIG. 6. The first end portion 134 of the pin 130 projects from the first end 120 of the sleeve 110 by a distance marked B in FIG. 6. This distance B is less than the distance marked A in FIG. 4.

With the parts of the actuator assembly 10 in this position, the distance by which the pin 130 projects into the chamber 16 determines the end-of-stroke position of the piston 18 in the direction 82. Thus, when the vehicle steerable wheels are turned far enough during operation of the steering gear assembly 12 to engage the steering stop, the parts of the steering gear assembly move to the position shown in FIG. 6. However, the end portion 76 of the valve member 72 engages the end face 136 of the pin 130 just prior to the time when the parts assume the position shown in FIG. 6. This engagement of the valve member 72 with the pin 130 causes the valve member 72 to move in the direction 84 relative to the piston 18, opening the fluid passage 68 in the valve seat 62. Fluid flows from the pressurized chamber portion 22 through the valve passage 58 into the chamber portion 20. This flow of fluid through the valve passage 58 relieves the pressure in the chamber portion 22, just prior to engagement of the steering stop, as is desired.

The steering gear assembly 12 may on occasion need to be reset to provide for an increased range of movement of the steerable wheels of the vehicle. In that case, the actuator assembly 10 needs to be adjusted to allow the piston 18 to move farther in the direction 82 prior to actuating the pressure relief valve assembly 50. This adjustment of the actuator assembly 10 to provide a different end-of-stroke position of the piston 18 is automatically accomplished in the same manner in which the actuator assembly is initially set, as described above.

Thus, the steering gear assembly 12 is operated to move the piston 18 in the direction 82 until the vehicle steering stops are engaged. During this movement of the piston 18 in the direction 82, the valve seat end face 64 engages the pin 130. The force of the moving piston 18 and valve seat 62 overcomes the press fit engagement between the pin 130 and the sleeve 110. The piston 18 pushes the pin 130 axially leftward in the direction 82, relative to and within the sleeve 110, until the piston 18 stops moving.

The parts are then in the position shown in FIG. 7. In this position, the first end portion 134 of the pin 130 projects from the first end 120 of the sleeve 110 by a distance marked C in FIG. 7. This distance C is less than the distance marked B in FIG. 4. Thus, as compared to the piston work stroke obtainable when the parts are in the position shown in FIG. 6, the piston 18 can move farther in the direction 82 before the actuator assembly 10 actuates the pressure relief valve assembly 50 to stop piston travel.

On occasion, the steering gear assembly 12 may also need to be adjusted to provide for a decreased range of movement of the vehicle steerable wheels. In that case, the actuator assembly 10 needs to be reset to limit the piston 18 to a shorter work stroke in the direction 82. Thus, the interfitted pin and sleeve 130 and 110 must be adjusted so that the pin projects farther into the chamber 16. This resetting of the actuator assembly 10 to provide a different end-of-stroke position of the piston 18 is performed as follows.

The power steering pump (not shown) is turned off. The sector gear 34 is disconnected from the vehicle part (typically the pitman arm) with which the sector gear is normally connected. The sector gear 34 is then pivoted to move the piston 18 in the direction 82 until the piston end face 66 engages the inner surface 230 of the housing 14. The valve seat 62 is recessed from the piston end face 66 so that the piston 18, not the valve seat 62, engages the housing 14.

During this movement of the piston 18, the valve stem 74 and the valve seat end face 64 engage the pin 130. The force of the moving piston 18 and valve seat 62 overcomes the press fit engagement between the pin 130 and the sleeve 110. The pin 130 moves axially in the direction 82, relative to and within the sleeve 110, until the piston 18 engages the housing 14 and stops moving.

The parts of the actuator assembly 10 are then in the position shown in FIG. 8. The pin 130 is at the furthest extent of its movement in the direction 82 relative to the sleeve 110. The first end portion 134 of the pin 130 extends from the first end 120 of the sleeve 110, in a direction 84, by a distance which is marked D in FIG. 8. The distance marked D in FIG. 8 is less than the distance marked A in FIG. 4, and is also less than the distances marked B in FIG. 6 and C in FIG. 7. The second end portion 138 of the pin 130 extends from the second end 124 of the sleeve 110, in the direction 82, by a distance which is greater than the distance marked D. The dimensions of the parts of the actuator assembly 10 are selected so that the second end face 140 of the pin 130 does not engage the seal plug 170.

The plug cap 180 is then removed to enable access to and manual removal of the other parts of the actuator assembly 10. A suitable tool such as a needle nose pliers is used to grasp the nose portion 186 of the seal plug 170 and remove the seal plug in the direction 82. The support tube 150, and the interfitted pin and sleeve 130 and 110, are also removed in the direction 82.

The interfitted pin and sleeve 130 and 110 are then reversed end for end, and reinserted manually into the actuator passage 112 in the direction 84. That is, the orientation of the interfitted pin and sleeve 130 and 110 is changed from a first orientation in which the first end portion 134 of the pin is disposed axially inward (to the right as viewed in the Figs.) of the second end portion 138, to a second orientation in which the second end portion of the pin is disposed axially inward of the first end portion. The interfitted pin and sleeve 130 and 110 are moved axially within the actuator passage 112 until the second end 124 of the sleeve engages the shoulder 122 on the housing 14, stopping inward movement of the assembled pin and sleeve. The interfitted pin and sleeve 130 and 110 are then in the position illustrated in FIG. 9.

The support tube 150 is then inserted manually in the direction 84 into the actuator passage 112, around the cylindrical outer surface 132 of the pin 130. The first end 158 of the support tube engages the first end 120 of the sleeve 110, blocking further inward movement of the support tube 150. It should be noted that the support tube 150 can be reversed end for end and still function properly within the actuator assembly 10.

The seal plug 170 is then inserted manually into the passage 112. The plug cap 180 is then screwed into the housing 14, to hold the seal plug 170, the support tube 150, the sleeve 110 and the pin 130 in place in the housing 14.

The parts of the actuator assembly 10 are then in the position shown in FIG. 9. The second end portion 138 of the pin 130 extends from the second end 124 of the sleeve 110 by a distance marked E in FIG. 9. This distance E is greater than the distances marked B, C and D, and is preferably the same as the distance marked A in FIG. 4. The distance marked E is great enough, so that when the steering gear assembly 12 is operated to move the piston 18 as far as possible in the direction 82 no matter where the vehicle steering stops are set, the valve seat face 64 of necessity engages the end face 140 of the pin 130. The second end portion 138 of the pin 130 extends farther into the chamber 16 than did the pin first end portion 134 when the parts were in the positions shown in FIGS. 6-8. Therefore, the pin 130 can engage the valve member 72 and actuate the valve assembly 50 when the piston 18 is farther to the right (as viewed in FIG. 1). The piston 18 thus will have a shorter work stroke in the direction 82. The desired end-of-stroke position of the piston 18 can then be set in the manner described above with reference to FIGS. 4-6.

In a preferred embodiment of the invention, the pin 130 is press fit in the sleeve 110 so that a maximum force in the range of about 2,000 pounds is needed to move the pin relative to the sleeve 110. This amount of force is easily obtainable in the adjusting and resetting operations described above when the steerable wheels of the vehicle are within their range of movement as set by the steering stops. This amount of force is selected to be in excess of any amount of force which might be experienced by the interfitted pin and sleeve 130 and 110 during other conditions. This minimizes the possibility of inadvertent movement of the pin 130 out of its properly set operating position.

Despite this secure mounting of the pin 130 in the housing 14, resetting of the actuator assembly 10 and thus of the end-of-stroke position of the piston 18 can, as described above, be accomplished without any special tools or without disassembly of the steering gear assembly 12. Further, the pin 130 and the sleeve 110 are the component parts of the actuator assembly 10 which, if any, are most likely to experience wear during the lifetime of the steering gear assembly 12. These parts can be easily removed and replaced without special tools or without disassembly of the steering gear assembly 12.

It should be understood that during normal operation of the steering gear assembly 12, fluid under pressure is present in the portions of the actuator passage 112 which are to the right of the O-ring 74 as viewed in FIG. 2. For example, fluid is present in the space between the seal plug 170 and the axially outer face of the pin 130. When the pin 130 is moved in the direction 82 toward the seal plug 170, fluid is forced out of that space through the annular space between the pin 130 and the support tube 150. This fluid flows radially outward through an opening 232 in the support tube 150. This fluid can thence flow through the clearance channel 154 disposed radially outward of the support tube 150, and in the direction 84 across the sleeve 110 and into the chamber 16.

Operation and setting of the second actuator assembly 200 (FIG. 1), to provide the end-of-stroke position of the piston 18 when the piston moves in the direction 84 (to the right as viewed in FIG. 1), are similar to operation and setting of the actuator assembly 10. The sleeve 204 is captured between the support tube 212 and the O-ring plug 202. The pin 208 is moved relative to the sleeve 204 by movement of the piston 18 to the right as viewed in FIG. 1, instead of to the left, in a manner similar to that described above. To reset the actuator assembly 200 to provide for a shorter work stroke of the piston 18 in the direction 84, the O-ring plug 202 is unscrewed from the housing 14, enabling removal, reversal, and reorientation of the interfitted pin and sleeve 208 and 204 in the housing.

From the above description of the invention, those skilled in the art will perceive improvements, changes and modifications in the invention. Such improvements, changes and modifications within the skill of the art are intended to be covered by the appended claims.

We claim:

1. A steering gear assembly for a vehicle having steerable wheels, comprising:
a housing defining a chamber;
a piston movable through a work stroke in said chamber, said piston having an end-of-stroke position;
means connecting said piston for movement with the steerable wheels of the vehicle; and
means for adjusting the end-of-stroke position of said piston;
said means for adjusting being mounted in said housing in a first orientation and being removable from said housing and being mountable in said housing in a second orientation opposite to said first orientation to reset the end-of-stroke position of said piston;
said means for adjusting comprising a pin press fit in a sleeve and movable relative to said sleeve to set the end-of-stroke position of said piston, said pin and sleeve being movable from a first relative position to a second relative position when said means for adjusting is in said first orientation, said means for adjusting being removed and mounted in said housing in said second orientation when said pin and sleeve are in the second position.

2. A steering gear assembly as set forth in claim 1 wherein said pin and sleeve are disposed in a slip fit relationship in a passage in said housing extending between said chamber and the exterior of said housing, said steering gear assembly including manually removable means for closing said passage.

3. A steering gear assembly as set forth in claim 2 wherein said sleeve is movable in said passage and said adjusting means includes means for blocking movement of said sleeve and thereby said pin in said passage.

4. A steering gear assembly as set forth in claim 3 wherein said means for blocking movement of said sleeve comprises a tubular support member circumscribing a portion of said pin and engaging said sleeve, said means for closing said passage engaging said tubular support member and blocking movement of said tubular support member in said passage.

5. A steering gear assembly as set forth in claim 4 wherein said means for closing said passage comprises a seal member disposed in said passage at a location intermediate said sleeve and said exterior of said housing, said seal member blocking fluid flow in a direction out of said chamber through said passage.

6. A steering gear assembly as set forth in claim 1 wherein said pin is movable relative to said sleeve upon the application of force to said pin by said piston to adjust the end-of-stroke position of said piston.

7. A steering gear assembly as set forth in claim 1 including a valve assembly mounted for movement with said piston relative to said pin, said valve assembly including a valve member engageable with said pin and supported in said piston for movement upon engagement with said pin from a first valve position blocking fluid flow through said valve assembly to a second valve position enabling fluid flow through said valve assembly.

8. A steering gear assembly as set forth in claim 7 wherein when said means for adjusting is in said second orientation said pin has an end portion projecting into said chamber by a distance sufficient to engage said valve member and move said valve member from the first valve position to the second valve position.

9. A steering gear assembly as set forth in claim 1 wherein when said means for adjusting is in said second orientation said pin has inner and outer opposite end portions extending from inner and outer opposite ends of said sleeve, said outer end portion of said pin extending from said outer end of sleeve by a distance greater the distance by which said inner end portion of said pin extends from said inner end of said sleeve.

10. A steering gear assembly as set forth in claim 1 wherein said housing includes a shoulder surface engageable with said sleeve to block movement of said sleeve in a direction toward said chamber, said sleeve being disposed in a slip fit relationship in said housing, said adjusting means comprising means for blocking movement of said sleeve and thereby said pin relative to said housing.

11. A method comprising the steps of:
press fitting a pin in a sleeve;
mounting the interfitted pin and sleeve in a first orientation in a steering gear assembly housing;
moving the pin relative to the sleeve to set the end-of-stroke position of a piston movable through a work stroke in the housing;
removing the interfitted pin and sleeve from the housing;
mounting the interfitted pin and sleeve in the housing in a second orientation opposite to the first orientation; and
moving the pin relative to the sleeve to reset an end-of-stroke position of the piston.

12. A method as set forth in claim 11 wherein said step of mounting the interfitted pin and sleeve in the first orientation comprises projecting a first end portion of the pin past a first end of the sleeve by a first distance, and placing at least a portion of the first end portion of the pin in the chamber.

13. A method as set forth in claim 11 wherein said step of mounting the interfitted pin and sleeve in the first orientation comprises placing the interfitted pin and sleeve in a passage in the housing which extends between the chamber and the exterior of the housing.

14. A method as set forth in claim 13 wherein said step of placing includes placing the sleeve in a slip fit relationship in the passage in the housing and blocking movement of the sleeve in the passage in the housing with a member separate from said sleeve.

15. A method as set forth in claim 11 wherein said step of mounting the interfitted pin and sleeve in the housing in the second orientation including projecting a first end portion of the pin from a first end of the sleeve by a first distance and at least partially in the chamber, and projecting a second opposite end portion of the pin from a second opposite end of the sleeve by a second distance which is less than the first distance.

16. A method as set forth in claim 11 wherein said step of moving the pin relative to the sleeve to set the end-of-stroke position of the piston includes engaging the pin with the piston and applying sufficient force to the pin with the piston to move the pin in the sleeve.

17. A method as set forth in claim 11 wherein said step of moving the pin relative to the sleeve to set the end-of-stroke position of the piston includes projecting an inner end portion of the pin from an inner end of the sleeve by a first distance, and said step of mounting the interfitted pin and sleeve in the housing in the second orientation includes projecting an inner end portion of the reoriented pin from an inner end of the sleeve by a second distance which is greater than the first distance.

18. A method as set forth in claim 11 wherein said step of removing the interfitted pin and sleeve from the housing comprises removing a closure member which closes a passage in the housing, removing from the passage in the housing a seal member which blocks fluid flow out of the chamber through the passage, removing from the passage in the housing a support member, and removing from the passage in the housing the interfitted pin and sleeve.

* * * * *